US00RE34596E

United States Patent [19]

Masuda et al.

[11] E Patent Number: Re. 34,596

[45] Reissued Date of Patent: May 3, 1994

[54] VALVE DRIVING SYSTEM FOR INTERNAL COMBUSTION ENGINE

[75] Inventors: Shunji Masuda; Eiji Nakai, both of Hiroshima, Japan

[73] Assignee: Mazda Motor Corporation, Hiroshima, Japan

[21] Appl. No.: 570,917

[22] Filed: Aug. 22, 1990

Related U.S. Patent Documents

Reissue of:

[64] Patent No.: 4,765,289
Issued: Aug. 23, 1988
Appl. No.: 105,730
Filed: Oct. 7, 1987

[30] Foreign Application Priority Data

Sep. 16, 1986 [JP] Japan ..... 61-246084

[51] Int. Cl.[5] ..... F01L 1/34

[52] U.S. Cl. ..... 123/90.16; 123/90.17; 123/90.44

[58] Field of Search ..... 123/90.15, 90.16, 90.17, 123/90.27, 90.22, 90.39, 90.40, 90.41, 90.44, 90.46

[56] References Cited

U.S. PATENT DOCUMENTS

| | | | |
|---|---|---|---|
| 4,534,323 | 8/1985 | Kato et al. | 123/90.44 |
| 4,612,884 | 9/1986 | Ajiki et al. | 123/90.16 |
| 4,690,110 | 9/1987 | Nishimura et al. | 123/90.17 |
| 4,726,332 | 2/1988 | Nishimura et al. | 123/90.16 |
| 4,727,830 | 3/1988 | Nagahiro et al. | 123/90.16 |
| 4,727,831 | 3/1988 | Nagahiro et al. | 123/90.16 |
| 4,788,946 | 12/1988 | Inoue et al. | 123/90.16 |
| 4,790,274 | 12/1988 | Inoue et al. | 123/198 F |
| 4,793,296 | 12/1988 | Inoue et al. | 123/90.16 |
| 4,869,214 | 9/1989 | Inoue et al. | 123/90.16 |

FOREIGN PATENT DOCUMENTS 0058605 4/1986 Japan .

*Primary Examiner*—Willis R. Wolfe
*Attorney, Agent, or Firm*—Keck, Mahin & Cate

[57] ABSTRACT

A valve driving system for an internal combustion engine having two intake valves and/or two exhaust valves for each cylinder, which includes a cam shaft formed with a pair of low speed cams and a high speed cam located at substantially the center part of the cam shaft, a pair of first rocker arms driven by the low speed cams respectively, each having a portion engaged with one of the valves, second rocker arms driven by the high speed cam and located between the first rocker arms, two oil pressure chambers formed in the second rocker arm and facing the respective first rocker arms, two plungers, each being provided in one of the oil chambers, two bores each being formed engageably with one of the plungers in one of the first rocker arms, an oil passage formed in the second rocker arm and communicated with both oil pressure chambers, and a control valve for controlling oil pressure fed to the oil passage in accordance with the engine operating condition.

12 Claims, 4 Drawing Sheets

VALVE DRIVING SYSTEM FOR INTERNAL COMBUSTION ENGINE

Matter enclosed in heavy brackets [ ] appears in the original patent but forms no part of this reissue specification; matter printed in italics indicates the additions made by reissue.

CROSS REFERENCE OF RELATED APPLICATIONS

The present invention relates generally to the subject matter of the following prior U.S. patent application: Ser. No. 855,436, filed Apr. 24, 1986, entitled "Variable Valve Mechanism For Internal Combustion Engines", now U.S. Pat. No. 4,690,110.

BACKGROUND OF THE INVENTION

The present invention relates to a valve driving system for an internal combustion engine, and more particularly to such a valve driving system capable of selecting one of a plurality of cams for driving intake valves and/or exhaust valves in accordance with engine rpm.

DESCRIPTION OF PRIOR ART

There is known an internal combustion engine which has two intake valves and/or two exhaust valves to take in greater amount of intake air and/or discharge greater amount of exhaust gas and which is suitable for operation at high engine rpm or high engine output.

However, since the cross-sectional area of the intake passage and/or the exhaust passage is large in this engine, intake air often passes through directly from the intake passage to the exhaust passage and the charging efficiency is inevitably decreased at low engine rpm, whereby the engine output is degraded.

In order to solve this problem, Unexamined Japanese Utility Model Publication No. 58605/1986 discloses a valve driving system for an internal combustion engine having two intake valves and two exhaust valves for each cylinder thereof. In this prior art system, there are provided a first rocker arm pivotally mounted on a rocker shaft and engaged with the respective intake valves for driving them under low speed engine operating condition in accordance with the movement of a low speed cam having a cam lobe suitable for low speed engine operation and, on the side of the first rocker arm, a second rocker arm pivotally mounted on the rocker shaft for driving the respective intake valves by engagement with the first rocker arm under high speed engine operating condition in accordance with the movement of a high speed cam having a cam lobe suitable for high speed engine operation and an engaging means for engaging the second rocker arm with the first rocker arm under high engine rpm and releasing the engagement between the second rocker arm and the first rocker arm under low engine rpm. For the respective exhaust valves, an identical valve driving mechanism is employed.

According to this prior art system, since the second rocker arm is not engaged with the first rocker arm at low engine rpm and it is engaged with the first rocker arm at high engine rpm, it is possible to drive the intake valves and exhaust valves in accordance with movement of the low speed cam under low engine rpm operating condition and drive the intake valves and exhaust valves in accordance with the high speed cam under high engine rpm operating condition, whereby the intake valves and exhaust valves can be opened and closed at timings determined in accordance with engine rpm.

However, in this prior art system, since the second rocker arm is arranged on the side of the first rocker arm and the high speed cam is not positioned at a center portion of both intake valves, an undesired force which produces a moment of force in a plane other than the plane perpendicular to the axis of the rocker shaft acting on the rocker shaft, whereby the friction resistance between the rocker shaft and the second rocker arm is increased and the durability of the valve driving system is lowered since the second rocker arm and the rocker shaft are often worn nonuniformly.

SUMMARY OF THE INVENTION

It is therefore the object of the present invention to provide a valve driving system for an internal combustion engine having two valves for one or both of an intake port and an exhaust port for each cylinder thereof which has high durability and simple structure.

According to the present invention, the above and other objects can be accomplished by a valve driving system for an internal combustion engine in which two valves are provided for one or both of an intake port and an exhaust port in each cylinder, said valve driving system comprising cam shaft means formed with two types of cams of different shapes, one of which consists of a pair of low speed cams located at the end portion of said cam shaft means and the other of which consists of a high speed cam located at substantially the center part of said cam shaft means, a pair of first rocker arm means driven by said low speed cams respectively, each having a portion engaged with one of said valves, second rocker arm means driven by said high speed cam and located between said first rocker arm means, a pair of oil pressure chamber means formed in said second rocker arm means, a pair of plunger means each being provided in one of said oil pressure chamber means, a pair of bores each being formed engageably with one of said plunger means in one of said first rocker arm means, oil passage means formed in said second rocker arm means and communicated with said oil pressure chamber means and control means for controlling oil pressure fed to said oil passage means in accordance with engine operating condition.

The above and other objects and features of the present invention will become apparent from the following description made with reference to the accompanying drawings.

DESCRIPTION OF THE PREFERRED EMBODIMENTS

Figure 1:
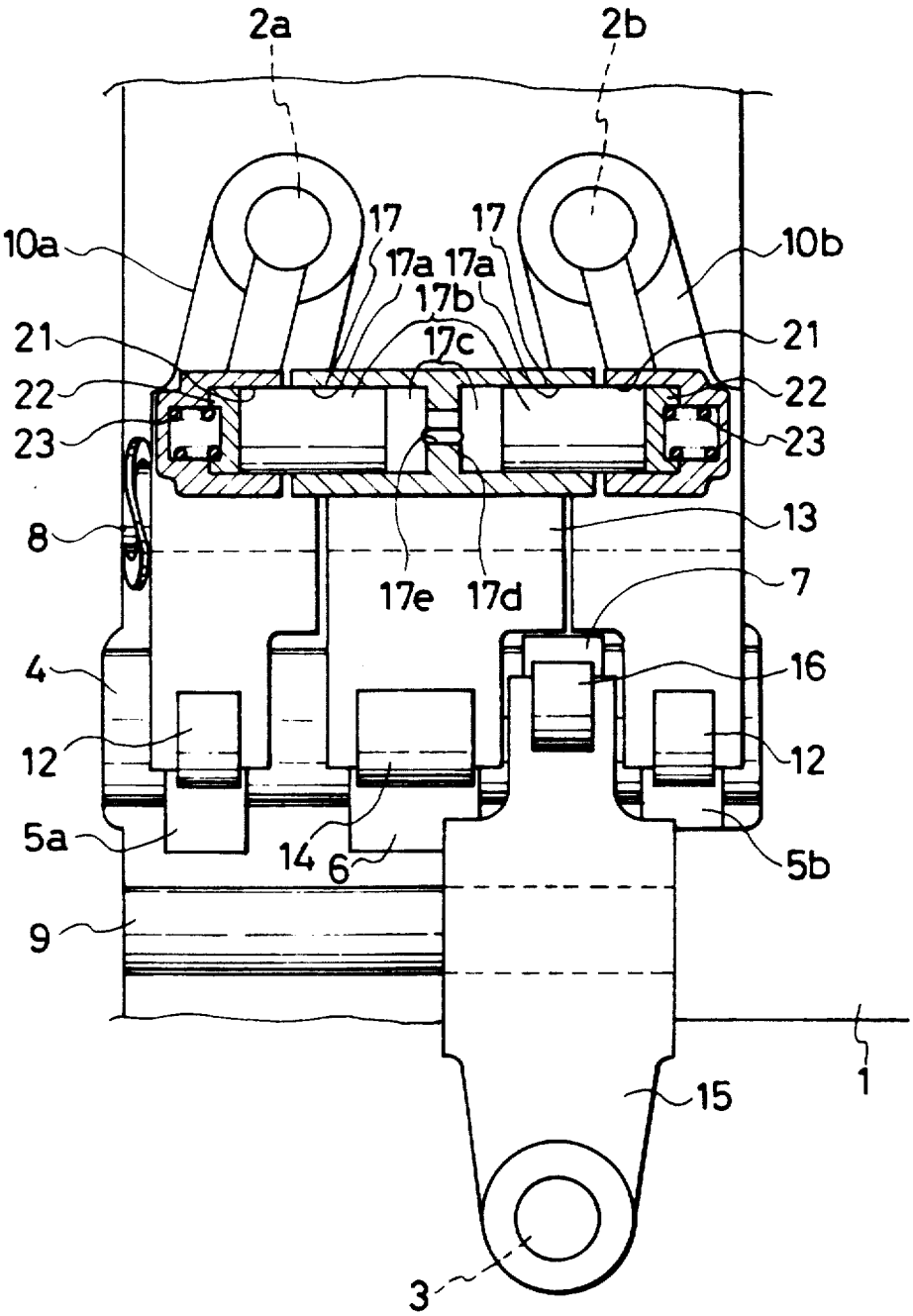
FIG. 1 is a schematic drawing showing a plan view of a valve driving system for an internal combustion engine which is an embodiment of the present invention.
Figure 2:
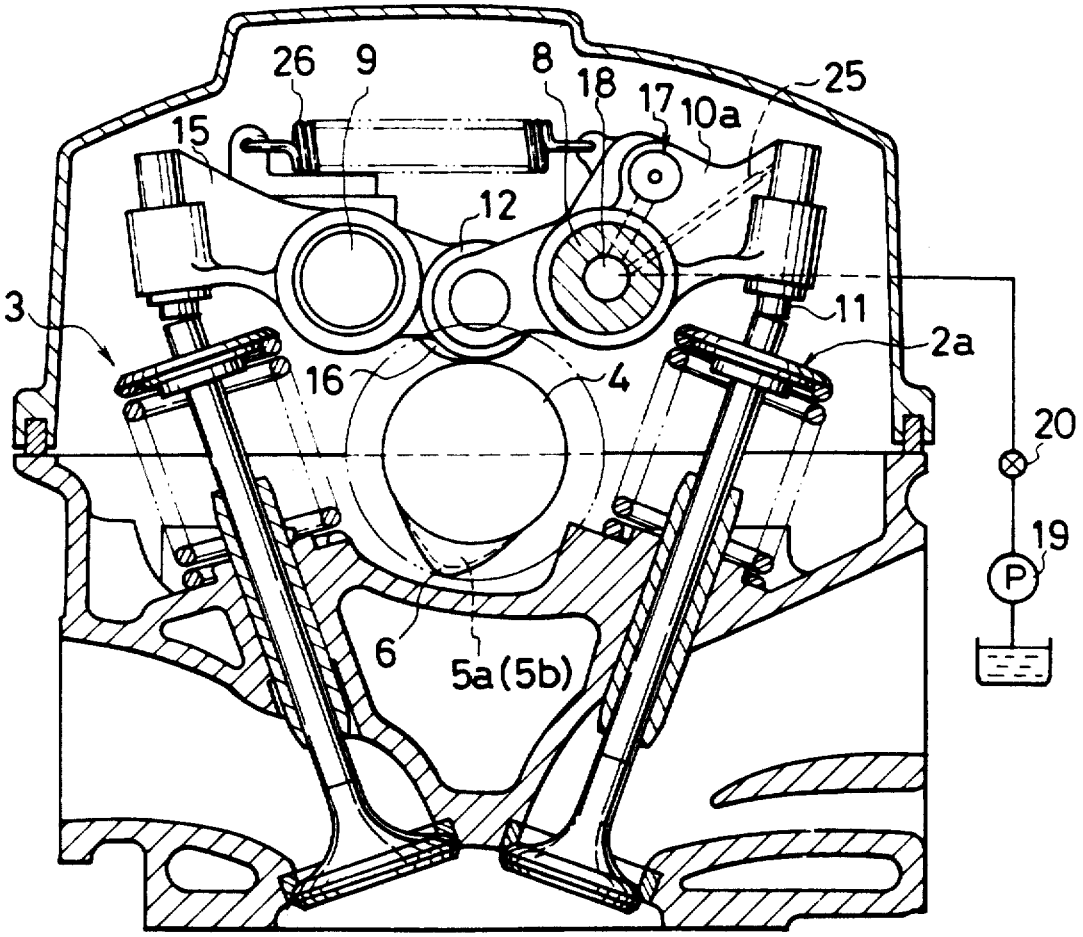
FIG. 2 is a schematic drawing showing a side view of a valve driving system for an internal combustion engine which is an embodiment of the present invention.

Referring to FIGS. 1 and 2, there is shown one cylinder of an internal combustion engine having a plurality of cylinders formed below a cylinder head 1 and each cylinder has two intake valves 2a and 2b for opening and shutting respective intake ports and one exhaust valve 3 for discharging exhaust gas from the cylinder.

Over the cylinder head 1, a camshaft 4 is provided between the intake valves 2a and 2b and the exhaust valve 3, and is formed with a pair of low speed cams 5a and 5b and a high speed cam 6. The high speed cam 6 is located at substantially the center portion between the low speed cams 5a and 5b. The high speed cam 6 has a cam lobe which is larger than the cam lobes in the low speed cams 5a and 5b so that the high speed cam 6 can provide greater cam lift and cam open period than the low speed cams 5a and 5b. A cam 7 for driving the exhaust valve 3 is provided between one of the low speed cams 5b and the high speed cam 6.

Further, there are arranged a first rocker shaft 8 on the side of the intake valves 2a and 2b with respect to the camshaft 4 and a second rocker shaft 9 on the side of the exhaust valve 3 with respect to the camshaft 4. There are pivotally mounted on the first rocker shaft 8 first rocker arms 10a and 10b for driving the intake valves 2a and 2b respectively. The respective first rocker arms 10a and 10b are arranged so that they are engaged with the stem of the intake valves 2a, 2b at one end thereof and that they are engaged with the low speed cams 5a and 5b at the other end. At one end of each of the first rocker arms 10a and 10b, a hydraulic lash adjustor 11 is provided so that the end of each of the first rocker arms 10a and 10b is engaged with the stem of one of the intake valves 2a and 2b without any lash between them and at the other end of each of the first rocker arms 10a and 10b, there is provided roller cam followers 12 for reducing sliding friction between the end of each of the first rocker arms 10a, 10b and one of the low speed cams 5a, 5b. An oil passage 8a is formed in the first rocker shaft 8 for feeding oil to the hydraulic lash adjustor 11 and an engaging device (explained later). The reference numeral 25 designates an oil passage communicated with the oil passage 8a for feeding oil to the hydraulic lash adjustors 11.

A second rocker arm 13 for transmitting the movement of the high speed cam 6 to the respective first rocker arms 10a and 10b is pivotally mounted on the first rocker shaft 8 at substantially the center portion between the first rocker arms 10a and 10b and it is engaged with the high speed cam 6 at one end thereof. There is provided a spring 26 for pressing the end of the second rocker arm 13 against the high speed cam 6 and preventing the second rocker arm 13 from hitting the high speed cam 6 at low engine rpm. At the end of the second rocker arm 13, there is provided a roller cam follower 14 for reducing sliding friction between the end of the second rocker arm 13 and the high speed cam 6. The axial length of the roller cam follower 14 is determined larger than that of the roller cam follower 12.

Moreover, a third rocker arm 15 for transmitting the movement of the cam 7 for driving the exhaust valve 3 to the exhaust valve 3 is pivotally mounted on the second rocker shaft 9 and at one end thereof, a roller cam follower 16 is provided for reducing sliding friction between the end of the third rocker arm 15 and the cam 7.

In order to releasably connect the first rocker arms 10a and 10b and the second rocker arm 13, there are provided a pair of engaging devices 17. Each of the engaging devices 17 comprises a cylinder bore 17a formed in the second rocker arm 13, a plunger 17b slidably received in the cylinder bore 17a and a oil pressure chamber 17c formed by the cylinder bore 17a and the plunger 17b. There is provided a wall 17d for separating the oil pressure chamber of one engaging device 17 from that of the other between the oil pressure chambers 17c of the respective engaging devices 17. An oil passage 17e for feeding oil to the respective oil pressure chambers 17c opens to the respective oil pressure chambers 17c at the wall 17d. The oil passage 17e is communicated with the oil passage 8a formed in the first rocker shaft 8. It is preferable that the oil passage 17e be formed by a drill so as to be oblique toward the upstream direction of the oil passage 8a, so that oil can be easily introduced into the oil pressure chamber 17c. Each of the oil pressure chambers 17c is communicated with an oil pump 19 through an oil passage 17e formed in the second rocker arm 13, the oil passage 8a being a formed in the rocker shaft 8 and connected with an oil passage 18. There is provided within the oil passage 18 a valve 20 for opening and closing the oil passage 18 in accordance with engine rpm. Bores 21 for receiving the plunger 17b are formed in the respective first rocker arm 10a and 10b and plunger receivers 22 are provided in the respective bores 21 so that the respective plungers are maintained in abutting engagement with it. In each of the bores 21, there is a spring 23 which biases the plunger 17b outwards through the plunger receiver 22. At low engine rpm, the opening of the valve 20 is reduced to reduce the amount of oil fed to the oil pressure chamber 17c and the oil pressure in the oil pressure chamber 17c becomes low, whereby the plunger 17b is forced to be moved outside of the bore 21 by the spring 23 and to be received by the wall 17d in the cylinder bore 17a and the second rocker arm 13 gets unengaged with the first rocker arms 10a and 10b. On the other hand, at high engine rpm, the valve opens the oil passage 18 and the oil pressure in the respective oil pressure chambers 17c is increased to become larger than pressure by the spring 23, whereby the respective plungers 17b get received in the bores 21 of the first rocker arms 10a and 10b and the second rocker arm 13 get engaged with the respective first rocker arms 10a and 10b.

According to the above described embodiment, since the second rocker arm 13 is not engaged with the first rocker arms 10a and 10b at low engine rpm, the movement of the low speed cams 5a and 5b is transmitted to the intake valves 2a and 2b by the first rocker arms 10a and 10b and the intake valves 2a and 2b are driven by the low speed cams 5a and 5b, and, on the other hand, at high engine rpm, since the second rocker arm 13 is engaged with the first rocker arms 10a and 10b the movement of the high speed cam 6 is transmitted to the intake valves 2a and 2b through the second rocker arm 13 and the first rocker arms 10a and 10b and the intake valves 2a and 2b are driven by the high speed cam 6.

Figure 3A:
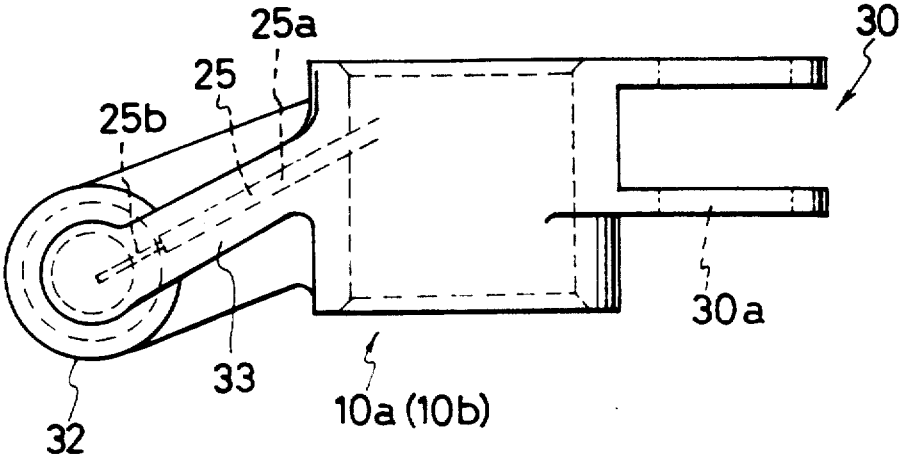
FIG. 3A is a schematic drawing showing a plan view of a rocker arm engaged with an intake valve, which is used in an embodiment of the present invention.
Figure 3B:
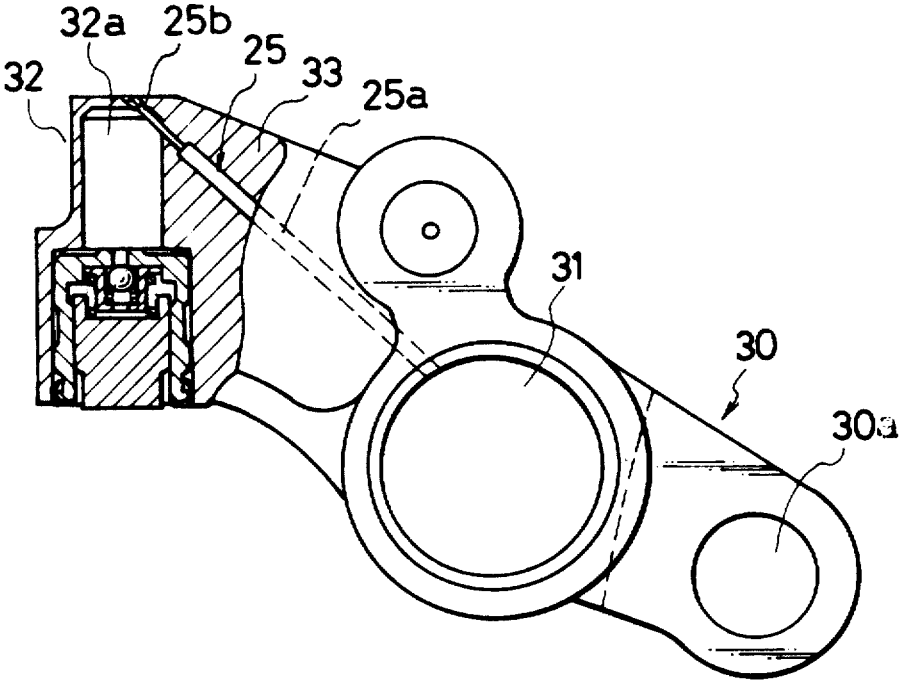
FIG. 3B is a schematic drawing showing a side view of a rocker arm engaged with an intake valve, which is used in an embodiment of the present invention.

Referring to FIGS. 3A and 3B, there are shown details of the first rocker arms 10a, 10b used in this embodiment. In FIGS. 3A and 3B, the reference numeral 30 designates a fork portion for supporting the roller cam follower 12 and there is provided at the fork portion a bore 30a for engaging a shaft for supporting the roller cam follower 12. Further, there are provided a bore 31 in which the first rocker shaft 8 extends and a housing 32 for the hydraulic last adjustor 11. A portion in the vicinity of the bore 31 and the housing 32 are connected by a reinforcing rib 33, extending substantially straight, in which the oil passage 25 for feeding oil to the hydraulic lash adjustor 11 is formed. The oil passage 25 consists of a bore 25a having large diameter and a bore 25b having small diameter and is formed by a drill so that the bore 25a is drilled from the side of the rocker shaft bore 31 and that the bore 25b is drilled from the side of the housing 32 through a reservoir chamber 32a, since it is difficult to form the oil passage 25 over the whole length by a drill having a small diameter although it is preferable for effectively removing air from the reservoir chamber 32a that the diameter of the bore be small.

Figure 4A:
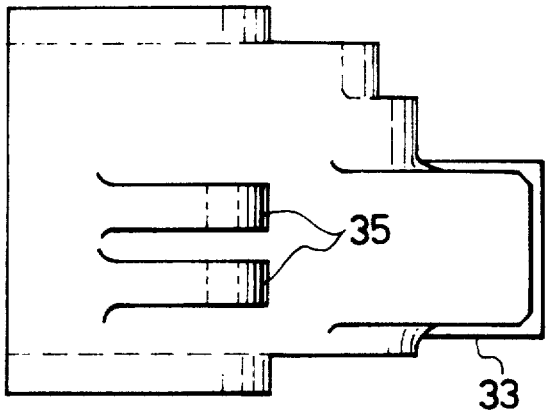
FIG. 4A is a schematic drawing showing a plan view of a rocker arm driven by a high speed cam, which can be used for the present invention.
Figure 4B:
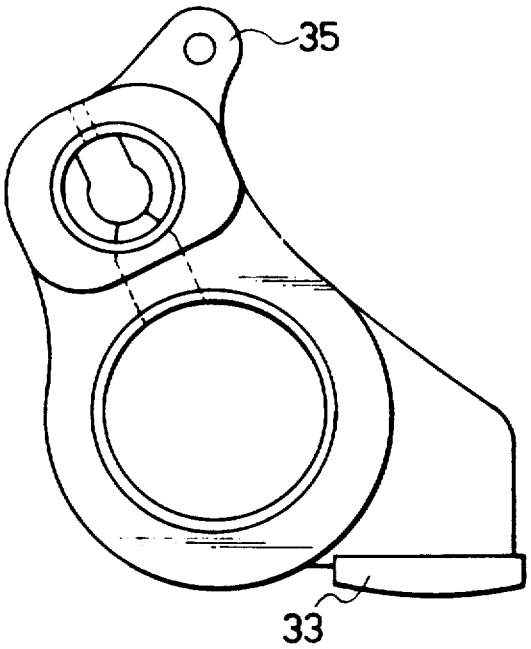
FIG. 4B is a schematic drawing showing a side view of a rocker arm driven by a high speed cam, which can be used for the present invention.
Figure 4C:
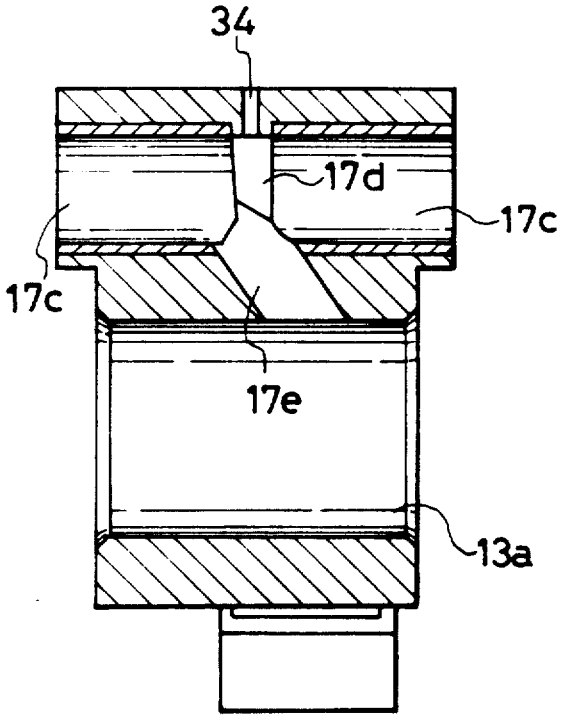
FIG. 4C is a schematic drawing showing a partial cross sectional view of a rocker arm driven by a high speed cam, which can be used for the present invention.

FIGS. 4A to 4C show details of a second rocker arm 13 which is somewhat different from that used in the above described embodiment in the structure of the engaged portion with the high speed cam 6, although the basic structure is the same as that in the above described embodiment so that corresponding parts are designated by the same numerals as in the previous embodiment. In FIGS. 4A to 4C, the end of the second rocker arm is formed with a slipper 33 and is directly and slidably engaged with the high speed cam 6 in place of interposing the roller cam follower 14 between them in order to prevent the weight of the system from increasing, since the end portion of the second rocker arm 13 is engaged with the high speed cam 6 only at high rpm, while the end of each of the first rocker arms 10a and 10b is engaged under normal engine operating condition. The main body of the second rocker arm 13 is usually made of aluminum alloy but it is preferable to make the slipper 33 of special cast iron or ceramic for improving wear resistance. As shown in FIG. 4C, the oil passage 17e communicates with a bore 13a formed in the second rocker arm 13 for extending the rocker shaft 8 therein to the wall 17d for separating the respective oil pressure chambers 17c, and is formed by a drill so as to extend obliquely and upwardly toward the downstream direction of oil in order to make it easier to feed oil to the respective oil pressure chambers 17c and increase the oil pressure in the oil pressure chambers 17c to a predetermined pressure as soon as the valve 20 is opened. Further, there is provided a hole 34 for removing air from the respective oil pressure chambers 17c. The reference numeral 35 designates a supporting portion for securing the spring 26 for pressing the second rocker arm 13 against the high speed cam 6.

According to the present invention, since forces produced by the high speed cam are transmitted from the high speed cam to the respective intake valves through substantially symmetrical paths with respect to the high speed cam, no moment of a force acts on the rocker shaft in a plane other than the plane perpendicular to the axis of the rocker shaft and the second rocker arm and the rocker shaft can be prevented from being non-uniformly worn, whereby the durability of the valve driving system can be remarkably improved. Further, since the engaging devices for engaging the second rocker arm with the respective rocker arms are located within the second rocker arm, oil can be fed to the respective engaging devices by a single oil passage, whereby the structure of the valve driving system can be made simple.

The present invention has thus been shown and described with the reference to the specific embodiments. However, it should be noted that the present invention is in no way limited to the details of the described arrangements but changes and modifications may be made without departing from the scope of the appended claims.

For example, although the internal combustion engine is provided with two intake valves and one exhaust valve in the above described embodiments, the present invention can be applied to an engine having two intake valves and two exhaust valves. Further, although the intake valves are driven by the low speed cams or the high speed cam selectively in accordance with engine rpm in the above described embodiments, two exhaust valves can be driven in accordance with the present invention.

Furthermore, although the oil passages 17e and 25 are communicated with the oil passage 8a in the above described embodiment, they can be independent passages for controlling the oil pressure in them independently. In such case, it is very advantageous to provide the oil passage 25 for feeding oil to the lash adjustor 11 in each of the first rocker arms 10a and 10b as shown in the above described embodiment.

We claim:

1. A valve driving system for an internal combustion engine in which two valves are provided for one or both of an intake port and an exhaust port in each cylinder, said valve driving system comprising cam shaft means formed with two types of cams of different shapes, one of which consists of a pair of low speed cams located at the end portion of said cam shaft means and the other of which consists of a high speed cam located at substantially the center part of said cam shaft means, a pair of first rocker arm means driven by said low speed cams respectively each having a portion engaged with one of said valves, second rocker arm means having a bore therein and driven by said high speed cam and located between said first rocker arm means, a pair of oil pressure chamber means formed in said second rocker arm means, a pair of plunger means each being provided in one of said oil pressure chamber means, two bores each being formed engageably with one of said plunger means in each of said first rocker arm means, oil passage means formed in said second rocker arm means and communicated with said two oil pressure chamber means and control means for controlling oil pressure fed to said oil passage means in accordance with engine operating condition.

2. A valve driving system in accordance with claim 1 which further includes a rocker shaft means for pivotally mounting said first and second rocker arm means and in which each of said oil pressure chamber means has a cylindrical bore in which said plunger means can move slidably and in which a bore if formed in said second rocker arm means in which said rocker shaft means extends and which further includes wall means for separating said oil pressure chamber means and receiving said plunger means and in which said oil passage means formed in the second rocker arm means is communicated with the respective cylindrical bores and said bore formed in the second rocker arm means and opening at said wall means.

3. A valve driving system in accordance with claim 2 which further includes an oil passage means formed in said rocker shaft means and in which said oil passage means is connected with said oil passage means formed in said second rocker arm means at the inner surface of said bore formed in the second rocker arm means.

4. A valve driving system in accordance with claim [1] *10* which further includes lash adjusting means for adjusting lash between the end of *each of* said first rocker arm means and said [intake valve means for] *valves at* the end portion of each of said first rocker arm means and oil passage means formed in said first rocker arm means for feeding oil to said lash adjusting means.

5. A valve driving system in accordance with claim 4 which further includes *a rocker shaft means*, a *mounting* bore formed in *each of* said first rocker arm means for [being mounted] *mounting said first rocker arm means* on said rocker shaft means, a housing for *each* said lash adjusting means and a *straight* rib [means extending substantially straight for] connecting said housing and a portion *of said first rocker arm means* in the vicinity of said *mounting* bore, and in which said oil passage means *for feeding oil to said lash adjusting means* is formed in said rib [means].

6. A valve driving system in accordance with claim [1] *10* which further includes [roller] cam follower means [located at a position where said first rocker arm means is engaged] *mounted on each of said first rocker arm means for engaging* with said low speed [cam] *cams*.

7. A valve driving system in accordance with claim [1] *10* in which [one] *said* cam shaft means is located over a cylinder head and in which said internal combustion engine has two intake valves and one exhaust valve and which further includes a cam for driving said exhaust valve [means].

8. A valve driving system in accordance with claim 1 which further includes spring means for pressing the end of said second rocker arm means against said high speed cam.

9. A valve driving system for an internal combustion engine having first and second intake valve means and one exhaust valve means, said valve driving system comprising [one] cam shaft means located over a cylinder head, a first low speed cam, a high speed cam, an exhaust cam and a second low speed cam which are arranged in order in the axial direction of said cam shaft means, first rocker arm means driven by said first low speed cam and engaged with said first intake valve means, second rocker arm means driven by said high speed cam and not engaged with any of said valve means, third rocker arm means driven by said exhaust cam and engaged with said exhaust valve means, fourth rocker arm means driven by said second low speed cam and engaged with said second intake valve means, *a rocker shaft means including an axially extending bore defined inside of the rocker shaft means*, said first, second and fourth rocker arm means having bores for receiving *said* rocker shaft means and being swingably mounted on said rocker shaft means respectively, said second rocker arm means being located between said first and fourth rocker arm means and formed with a pair of oil pressure chamber means extending in the axial direction of said cam shaft means therein, each of said oil pressure chamber means having an opening facing one of said first and fourth rocker arm means and plunger means movable into and engageable with one of said first and fourth rocker arm means, wall means located between said [respective] *pair of* oil pressure *chamber* means for separating them and restricting the movement of said respective plunger means, first oil passage means formed in said second rocker arm means and communicated *in common* with said [respective] *pair of* oil pressure chamber means and the *bore* inside of said rocker shaft means, each of said first and fourth rocker arm means being formed with a bore therein for receiving said plunger means, said bore having therein return spring means for biasing said plunger means [to the outside thereof] *out of the bore*, lash adjusting means located at [the] ends of said first and fourth rocker arm means where they are engaged with said first and second intake valve means respectively for adjusting lash between the ends of said first and fourth rocker arm means and said first and second intake valve means, said lash adjusting means being in housing means, second oil passage means formed in said first and fourth rocker arm means for feeding oil to said housing means, said second oil passage means being communicated with the *bore* inside of said rocker shaft means and said housing means [and], *said second oil passage means being* formed in rib means extending substantially straight and connecting said housing means and a portion of said first and fourth rocker arm means in the vicinity of said bore for receiving said rocker shaft means, spring means for pressing the end portion of said second rocker arm means against said high speed cam and control means for controlling oil pressure in said rocker shaft means so as to be low *at low* engine rpm and high at high engine rpm.

*10. A valve driving system for an internal combustion engine in which two valves are provided for one or both of an intake port and an exhaust port in each cylinder, said valve driving system comprising cam shaft means formed with two types of cams of different shapes, one of which consists of a pair of low speed cams located on portions of said cam shaft means and the other of which consists of a high speed cam located substantially centrally between said low speed cams, a pair of first rocker arm means driven by said low speed cams respectively each having a portion engaged with one of said valves, second rocker arm means driven by said high speed cam and located between said first rocker arm means, a pair of oil pressure chamber means formed in said second rocker arm means, a pair of plunger means each being provided in one of said oil pressure chamber means, two bores each being formed for engaging with one of said plunger means, one of said two bores formed in each of said first rocker arm means, an oil passage formed in said second rocker arm means communicated in common with said pair of oil pressure chamber means and control means for controlling oil pressure fed to said oil passage in accordance with engine operating condition.*

*11. A valve driving system in accordance with claim 10 which further includes a rocker shaft means for pivotally mounting said first and second rocker arm means and in which each of said oil pressure chamber means has a cylindrical bore in which said plunger means can move slidably and in which an axially extending bore is formed in said rocker shaft means and which further includes wall means for separating said oil pressure chamber means and restricting movement of said plunger means, and in which said oil passage formed in the second rocker arm means is communicated with the cylindrical bores of said oil pressure chamber means and with said axially extending bore formed in the rocker shaft means, said oil passage formed in said second rocker arm means opening to said pair of oil pressure chamber means at said wall means.*

*12. A valve driving system in accordance with claim 10 which further includes spring means for pressing an end of said second rocker arm means against said high speed cam.*

* * * * *